(12) United States Patent
Koshimizu et al.

(10) Patent No.: US 12,083,719 B2
(45) Date of Patent: Sep. 10, 2024

(54) INSERT MOLDING SHEET

(71) Applicant: Panasonic Intellectual Property Management Co., Ltd., Osaka (JP)

(72) Inventors: Takanori Koshimizu, Osaka (JP);
Takashi Morimoto, Osaka (JP);
Tomonori Sugiyama, Osaka (JP);
Kazuhiko Kaneuchi, Osaka (JP);
Takeshi Kiritoshi, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 218 days.

(21) Appl. No.: 17/120,580

(22) Filed: Dec. 14, 2020

(65) Prior Publication Data

US 2021/0221036 A1 Jul. 22, 2021

(30) Foreign Application Priority Data

Jan. 20, 2020 (JP) .................. 2020-006864

(51) Int. Cl.
*B29C 45/14* (2006.01)
*B29C 33/12* (2006.01)
*B29L 9/00* (2006.01)
*B29L 31/00* (2006.01)

(52) U.S. Cl.
CPC ........ *B29C 45/14065* (2013.01); *B29C 33/12* (2013.01); *B29C 45/14811* (2013.01); *B29C 2045/14131* (2013.01); *B29C 2045/14147* (2013.01); *B29L 2009/003* (2013.01); *B29L 2031/722* (2013.01)

(58) Field of Classification Search
CPC ................. B29L 2009/003; B29C 2045/14131
See application file for complete search history.

(56) References Cited

U.S. PATENT DOCUMENTS

| | | | |
|---|---|---|---|
| 7,156,632 B2* | 1/2007 | Park ................. | B29C 45/2708 425/127 |
| 2004/0156937 A1* | 8/2004 | Park ................. | D06F 34/28 425/127 |
| 2014/0009363 A1* | 1/2014 | Takeuchi ......... | B29C 45/14065 343/872 |
| 2014/0043771 A1* | 2/2014 | Isoda ............... | H05K 7/02 361/728 |
| 2019/0322017 A1* | 10/2019 | Tanaka ............ | B29C 45/14065 |

FOREIGN PATENT DOCUMENTS

| | | |
|---|---|---|
| CN | 103568175 | 2/2014 |
| CN | 110385824 | 10/2019 |
| EP | 3124197 | * 2/2017 |

(Continued)

OTHER PUBLICATIONS

"Locator to Position and Retain Part in Injection molding tool", 2244 Research Disclosure, Dec. 1, 1993, p. 781, No. 356, Kenneth Mason Publication, Hamshipre, UK, GB, XP000425380 (Year: 1993).*

(Continued)

*Primary Examiner* — Edmund H Lee
(74) *Attorney, Agent, or Firm* — Wenderoth, Lind & Ponack, L.L.P.

(57) ABSTRACT

An insert molding sheet to be used for insert molding has a positioning rib to be fixed to a mold facing a cavity.

5 Claims, 20 Drawing Sheets

(56) References Cited

FOREIGN PATENT DOCUMENTS

| EP | 3148299 | * | 3/2017 |
|----|---------|---|--------|
| JP | 63-249611 | | 10/1988 |
| JP | 2-092511 | | 4/1990 |
| JP | 7-266372 | | 10/1995 |
| JP | 9-123208 | | 5/1997 |
| JP | 11-034104 | | 2/1999 |
| JP | 2000-296533 | | 10/2000 |
| JP | 2006-239892 | | 9/2006 |
| JP | 2011-005769 | | 1/2011 |
| JP | 2011-093122 | | 5/2011 |
| JP | 2014-35805 | | 2/2014 |
| JP | 2015-199321 | | 11/2015 |
| JP | 2019-181905 | | 10/2019 |
| WO | WO2011163544 | * | 12/2011 |
| WO | WO2012133234 | * | 10/2012 |
| WO | WO2014105615 | * | 7/2014 |
| WO | WO2018181503 | * | 10/2018 |

OTHER PUBLICATIONS

English Translation of Chinese Search Report dated Oct. 28, 2023 for the related Chinese Patent Application No. 202110051541.7 (4 pages).
Locator to Position and Retain Part in Injection Molding Tool, Research Disclosure, GB, Kenneth Mason Publications, Dec. 1, 1993, No. 356, p. 781 (2 pages).
Chinese Search Report dated Jul. 25, 2024 for the related Chinese Patent Application No. 2021100515417 (5 pages).

* cited by examiner

INSERT MOLDING SHEET

BACKGROUND

1. Technical Field

The present disclosure relates to an insert molding sheet used for insert molding, a molded product using the insert molding sheet, and a method of manufacturing the molded product.

2. Description of the Related Art

In general, in the method of performing insert molding using a decorative sheet, the decorative sheet to be coated is inserted into a cavity of a mold and sucked from an inner surface side of the cavity, the decorative sheet is brought into close contact with an inner surface of the cavity along the inner surface, and thus, a position of the decorative sheet is fixed. In this case, since there is no mechanism for fixing an insertion position of the decorative sheet, the position of the decorative sheet is inaccurate with respect to a finished product after the molding. Therefore, in insert molding of the related art, a plurality of positioning pins are provided outside a cavity of a mold, and a decorative sheet is positioned on the mold by engaging a plurality of openings with the decorative sheet (for example, refer to Japanese Patent Unexamined Publication No 9-123208).

FIG. 16 is a schematic perspective view illustrating one step of a method of manufacturing an insert molded product using a decorative sheet material described in Japanese Patent Unexamined Publication No 9-123208. As illustrated in FIG. 16, mold 101 has molding cavity 105, and a plurality of pins 104 are provided on an outer periphery of the cavity. A plurality of openings 103 provided in advance engages with decorative sheet 102, and thus, decorative sheet 102 is positioned with respect to mold 101 and inserted into cavity 105 in mold 101. After that, the mold is clamped and the insert molding is performed to position the decorative sheet with respect to a molded product.

SUMMARY

An insert molding sheet according to an aspect of the present disclosure is an insert molding sheet to be used for insert molding, and has a positioning rib to be fixed to a surface of a mold facing a cavity.

According to another aspect of the present disclosure, a method of manufacturing an insert molded product which injection-molds an insert molded product in a state where a stationary mold corresponding to a rear surface side of the insert molded product and a movable mold corresponding to a front surface side of the insert molded product are clamped, the method comprising: a step of interposing at least two insert molding sheets between the stationary mold and the movable mold, the two insert molding sheets being a first insert molding sheet disposed on the movable mold side and a second insert molding sheet disposed on the stationary mold side; and a step of clamping the stationary mold and the movable mold, and pouring an injection molding resin between the first insert molding sheet disposed on the movable mold side and the second insert molding sheet disposed on the stationary mold side to obtain an insert molded product having the first insert molding sheet on the front surface side and the second insert molding sheet on the rear surface side, wherein a positioning rib to be fixed to the stationary mold is provided on a surface on which an injection molding resin layer of the first insert molding sheet disposed on the movable mold side is formed, and in the second insert molding sheet disposed on the stationary mold side, a positioning rib to be fixed to the stationary mold is provided on a surface on a side opposite to the surface on which the injection molding resin layer is formed, and a hole through which the positioning rib of the first insert molding sheet passes is provided, a hole for disposing the positioning rib is provided at a location corresponding to the positioning rib of the first insert molding sheet and a hole for disposing the positioning rib is provided at a location corresponding to the positioning rib of the second insert molding sheet, on a surface of the stationary mold, and before the mold clamping, the positioning rib of the first insert molding sheet is fixed to the hole provided at the corresponding location of the stationary mold, and the positioning rib of the second insert molding sheet is fixed to the hole provided at the corresponding location of the stationary mold.

According to another aspect of the present disclosure, a method of manufacturing an insert molded product which injection-molds an insert molded product in a state where a stationary mold corresponding to a rear surface side of the insert molded product and a movable mold corresponding to a front surface side of the insert molded product are clamped, the method comprising: a step of interposing at least two insert molding sheets between the stationary mold and the movable mold, the two insert molding sheets being a first insert molding sheet disposed on the movable mold side and a second insert molding sheet disposed on the stationary mold side; and a step of clamping the stationary mold and the movable mold, and pouring an injection molding resin between the first insert molding sheet disposed on the movable mold side and the second insert molding sheet disposed on the stationary mold side to obtain an insert molded product having the first insert molding sheet on the front surface side and the second insert molding sheet on the rear surface side, wherein a positioning rib to be fixed to the stationary mold is provided on a surface on which an injection molding resin layer of the first insert molding sheet disposed on the movable mold side is formed, and in the second insert molding sheet disposed on the stationary mold side, a hole through which a positioning pin to be fixed to the stationary mold passes is provided on a surface on a side opposite to the surface on which the injection molding resin layer is formed, and a hole through which the positioning rib of the first insert molding sheet passes is provided, a hole for disposing the positioning rib is provided at a location corresponding to the positioning rib of the first insert molding sheet and a positioning pin passing through the hole is provided at a location corresponding to the hole of the second insert molding sheet, on a surface of the stationary mold, and before the mold clamping, the positioning rib of the first insert molding sheet is fixed to the hole provided at the corresponding location of the stationary mold, and the positioning pin provided at the corresponding location of the stationary mold is fixed to the hole of the second insert molding sheet.

DETAILED DESCRIPTIONS

Figure 1A:
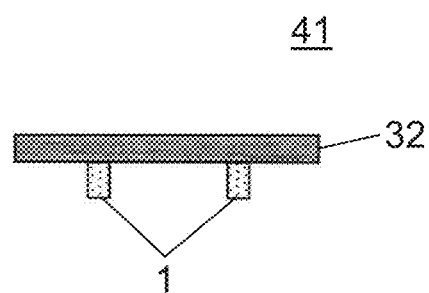
FIG. 1A is a cross-sectional view when an insert molding sheet according to a first exemplary embodiment is viewed from a direction perpendicular to a thickness direction of the insert molding sheet.

In the configuration of the related art, the opening is provided in the decorative sheet. Accordingly, a margin larger than an area of the decorative sheet required to coat the surface of the molded product is required, and thus, a loss of the material used for the decorative sheet increases.

An object of the present disclosure is to provide an insert molding sheet in which a loss of a material used for a decorative sheet is suppressed.

According to a first aspect, there is provided an insert molding sheet used for insert molding, including: a positioning rib to be fixed to a surface of a mold facing a cavity.

The insert molding sheet of the first aspect has the positioning rib to be fixed to the surface of the mold facing the cavity. Accordingly, a large margin is not required unlike in the related art and only a material having a required area can be used even when the material is trimmed. Therefore, it is possible to provide the insert molding sheet, the molded product, and the method of manufacturing a molded product capable of decreasing a loss of the material due to the margin in the material.

In the insert molding sheet of a second aspect, in the first aspect, the insert molding sheet may include a material sheet.

In the insert molding sheet of a third aspect, in the second aspect, the material sheet may be made of at least one material selected from the group consisting of a printed film, wood, stone, cork, cloth, leather, and metal.

In the insert molding sheet of a fourth aspect, in any one of the first to third aspects, the insert molding sheet further includes a functional layer, and the functional layer may have at least one function selected from the group consisting of antireflection, high reflection, light scattering, water repellency, hydrophilicity, sterilization, antibacterial, a high hardness function, and an image display function.

In the insert molding sheet of a fifth aspect, in any one of the first to fourth aspects, at least one selected from the group consisting of a sensor, an electric circuit, and an electronic component may be disposed on one surface of the insert molding sheet.

According to a sixth aspect, there is provided a method of manufacturing an insert molded product, including: a step of disposing the positioning rib of the insert molding sheet of any one of the first to fifth aspects on a surface of a mold facing a cavity; and a step of obtaining an insert molded product in which the insert molding sheet and an injection molding resin are integrated with each other by performing injection molding in a state where the insert molding sheet is disposed on the surface of the mold.

In the method of manufacturing an insert molded product of a seventh aspect, in the sixth aspect, the method may further include a step of preforming the insert molding sheet in advance in a state where the positioning rib of the insert molding sheet is disposed in the mold.

According to an eighth aspect, there is provided a method of manufacturing an insert molded product which injection-molds an insert molded product in a state where a stationary mold corresponding to a rear surface side of the insert molded product and a movable mold corresponding to a front surface side of the insert molded product are clamped, the method including: a step of interposing at least two insert molding sheets between the stationary mold and the movable mold, the two insert molding sheets being a first insert molding sheet disposed on the movable mold side and a second insert molding sheet disposed on the stationary mold side; and a step of clamping the stationary mold and the movable mold, and pouring an injection molding resin between the first insert molding sheet disposed on the movable mold side and the second insert molding sheet disposed on the stationary mold side to obtain an insert molded product having the first insert molding sheet on the front surface side and the second insert molding sheet on the rear surface side, in which a positioning rib to be fixed to the stationary mold is provided on a surface on which an injection molding resin layer of the first insert molding sheet disposed on the movable mold side is formed, and in the second insert molding sheet disposed on the stationary mold side, a positioning rib to be fixed to the stationary mold is provided on a surface on a side opposite to the surface on which the injection molding resin layer is formed, and a hole through which the positioning rib of the first insert molding sheet passes is provided, a hole for disposing the positioning rib is provided at a location corresponding to the positioning rib of the first insert molding sheet and a hole for disposing the positioning rib is provided at a location corresponding to the positioning rib of the second insert molding sheet, on a surface of the stationary mold, and before the mold clamping, the positioning rib of the first insert molding sheet is fixed to the hole provided at the corresponding location of the stationary mold, and the positioning rib of the second insert molding sheet is fixed to the hole provided at the corresponding location of the stationary mold.

According to a ninth aspect, there is provided a method of manufacturing an insert molded product which injection-molds an insert molded product in a state where a stationary mold corresponding to a rear surface side of the insert molded product and a movable mold corresponding to a front surface side of the insert molded product are clamped, the method including: a step of interposing at least two insert molding sheets between the stationary mold and the movable mold, the two insert molding sheets being a first insert molding sheet disposed on the movable mold side and a second insert molding sheet disposed on the stationary mold side; and a step of clamping the stationary mold and the movable mold, and pouring an injection molding resin between the first insert molding sheet disposed on the movable mold side and the second insert molding sheet disposed on the stationary mold side to obtain an insert molded product having the first insert molding sheet on the front surface side and the second insert molding sheet on the rear surface side, in which a positioning rib to be fixed to the stationary mold is provided on a surface on which an injection molding resin layer of the first insert molding sheet disposed on the movable mold side is formed, and in the second insert molding sheet disposed on the stationary mold side, a hole through which a positioning pin to be fixed to the stationary mold passes is provided on a surface on a side opposite to the surface on which the injection molding resin layer is formed, and a hole through which the positioning rib of the first insert molding sheet passes is provided, a hole for disposing the positioning rib is provided at a location corresponding to the positioning rib of the first insert molding sheet and a positioning pin passing through the hole is provided at a location corresponding to the hole of the second insert molding sheet, on a surface of the stationary mold, and before the mold clamping, the positioning rib of the first insert molding sheet is fixed to the hole provided at the corresponding location of the stationary mold, and the positioning pin provided at the corresponding location of the stationary mold is fixed to the hole of the second insert molding sheet.

According to a tenth aspect, there is provided an insert molded product including: the insert molding sheet of any one of the first to fifth aspects.

Hereinafter, insert molding sheets according to exemplary embodiments will be described with reference to the attached drawings. In the drawings, substantially the same members are designated by the same reference numerals.

First Exemplary Embodiment

Insert Molding Sheet

Figure 1B:
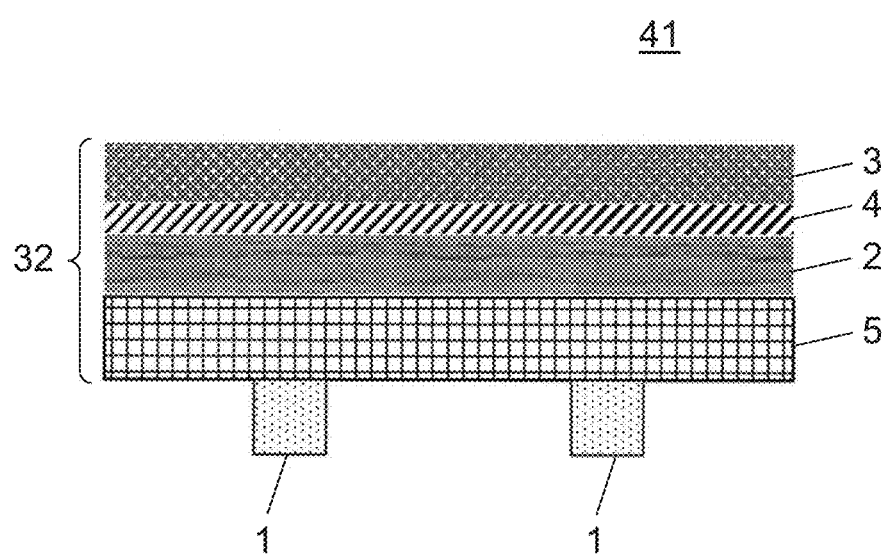
FIG. 1B is a cross-sectional view illustrating a detailed cross-sectional structure of the insert molding sheet of FIG. 1A.

FIG. 1A is a cross-sectional view when insert molding sheet 41 according to a first exemplary embodiment is viewed from a direction perpendicular to a thickness direction of insert molding sheet 41. FIG. 1B is a cross-sectional view illustrating a more detailed cross-sectional structure of insert molding sheet 41 of FIG. 1A.

Insert molding sheet 41 used for insert molding according to the first exemplary embodiment has positioning rib 1 on at least one surface. Positioning rib 1 is to be fixed to a surface of a mold facing a cavity. Insert molding sheet 41 has wood material sheet 32 using wood material 2 and positioning rib 1 provided on one surface of wood material sheet 32. In wood material sheet 32, support layer 5, wood material 2, adhesive layer 4, and thin film protective layer 3 are laminated in this order. Positioning rib 1 is provided on a side of support layer 5.

As will be described later, the insert molding sheet is not limited to the cross-sectional structure illustrated in FIG. 1B, and may have the cross-sectional structure illustrated in FIGS. 2A, 2B, 2C, 2D, 3A, and 3B.

Since insert molding sheet 41 has positioning rib 1 to be fixed to the surface of the mold facing the cavity, a margin is not required, and only a material having a required area can be used even when the material is trimmed. Therefore, a material loss due to the margin does not occur in the material.

As an insert molded product using insert molding sheet 41, a periphery of positioning rib 1 is filled with an injection molding resin. Accordingly, positioning rib 1 does not easily come off, and the injection molding resin is reinforced by positioning rib 1. As a result, it acts as a presser in a thickness direction, which is a depth direction when viewed from a front surface, and thus, occurrence of floating can be suppressed.

Method of Manufacturing Insert Molding Sheet

Next, a method of manufacturing the insert molding sheet will be described.

Figure 4A:
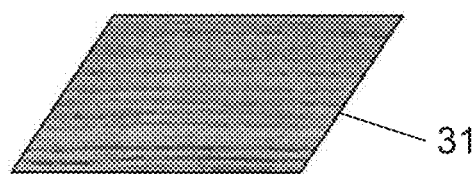
FIG. 4A is a schematic perspective view illustrating a material.
Figure 4B:
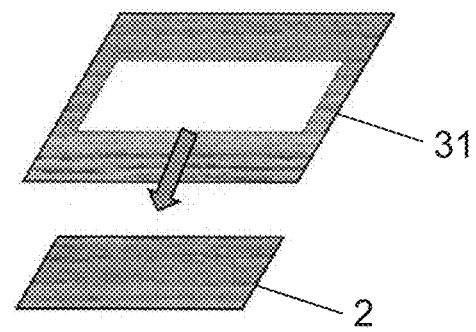
FIG. 4B is an explanatory view of a process of trimming a material to obtain a wood material.
Figure 5:
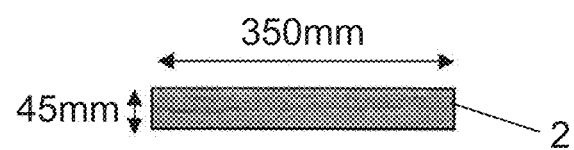
FIG. 5 is a plan view illustrating an example of a size required as a wood material.
Figure 6A:
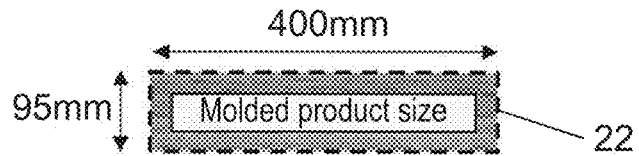
FIG. 6A is a plan view illustrating an example of a size of a wood material having a margin of a related art.
Figure 6B:
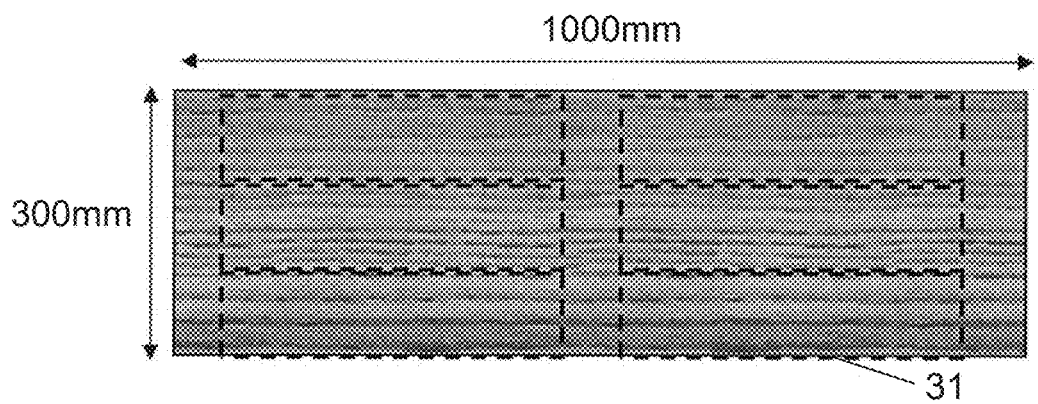
FIG. 6B is a plan view illustrating an example of obtaining the wood material having the margin of the related art illustrated in FIG. 6A from a material.
Figure 7A:
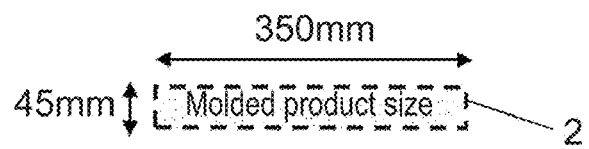
FIG. 7A is a plan view illustrating an example of a size of a wood material used for the insert molding sheet according to the first exemplary embodiment.
Figure 7B:
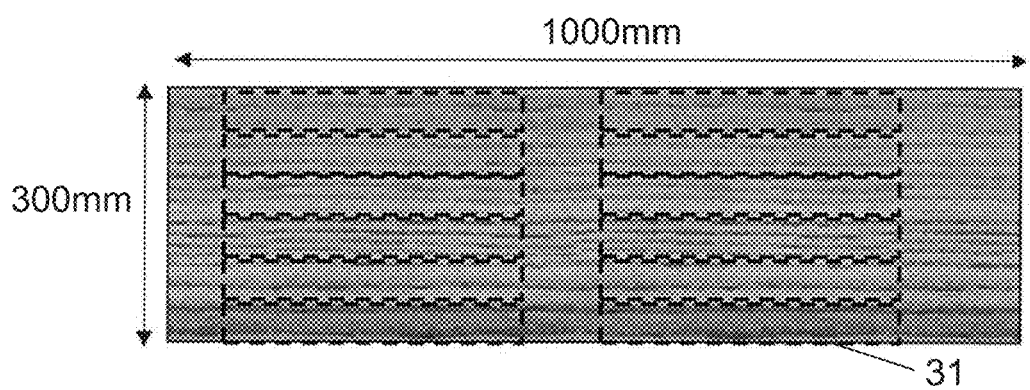
FIG. 7B is a plan view illustrating an example of obtaining the wood material used for the insert molding sheet according to the first exemplary embodiment illustrated in FIG. 7A from a material.

FIG. 4A is a schematic perspective view illustrating material 31. FIG. 4B is an explanatory view of a process of trimming material 31 to obtain wood material 2. FIG. 5 is a plan view illustrating an example of a size required for wood material 2. FIG. 6A is a plan view illustrating an example of a size of wood material 22 having a margin of a related art. FIG. 6B is a plan view illustrating an example of obtaining wood material 22 having the margin of the related art illustrated in FIG. 6A from material 31. FIG. 7A is a plan view illustrating an example of the size of wood material 2 used for insert molding sheet 41 according to the first exemplary embodiment. FIG. 7B is a plan view illustrating an example of obtaining wood material 2 used for the insert molding sheet according to the first exemplary embodiment illustrated in FIG. 7A from material 31.

Here, a case where wood material 2 made of a material is used for insert molding sheet 41 illustrated in FIG. 1B will be described. As illustrated in FIG. 4B, wood material 2 is obtained by trimming material 31 into a shape required for coating a surface of the final molded product.

Here, with reference to FIGS. 6A to 7B, a difference between the trimming of the wood material having the margin used for the insert molding sheet of the related art and the trimming of the wood material used for the insert molding sheet according to the first exemplary embodiment will be described. As a precondition, as illustrated in FIG. 5, the size of material 31 is 300 mm×1000 mm, and the size of wood material 2 in the molded product is 45 mm×350 mm. In the method of the related art, as illustrated in FIG. 6A, assuming that a margin of 25 mm per side is required to form a hole for positioning the mold in an outer peripheral portion of wood material 22, as illustrated in FIG. 6B, six wood materials 22 can be obtained from material 31. Meanwhile, in the wood material used for the insert molding sheet according to the first exemplary embodiment, as illustrated in FIG. 7A, it is not necessary to form the hole for positioning the mold on the outer peripheral portion of wood material 2, and thus, it is not necessary to provide an unnecessary margin. Therefore, 12 wood materials 2 can be obtained from material 31, and the material loss of material 31 can be reduced as compared with the method of the related art.

Next, as illustrated in FIGS. 1A and 1B, positioning rib 1 is formed on the rear surface of wood material sheet 32 including wood material 2. In this case, positioning rib 1 may be formed directly on wood material sheet 32 by injection molding, or a positioning rib which is manufactured in advance may be attached to wood material sheet 32. An example of a method of manufacturing positioning rib 1 in advance includes injection molding, 3D printer, cutting, die cutting, polishing, or the like, but there is no particular limitation as long as positioning can be performed. An example of a method of attaching positioning rib 1 includes ultrasonic welding, adhesive, heat fusion, heat melting, solder welding, fixing with tape, or the like, but it is not necessary to limit the method to these as long as the same effect can be obtained.

An example of a material of positioning rib 1 to be formed includes a commercially available general-purpose resin such as a PMMA resin, an ABS resin, a PS resin, and a PC resin. In addition, it is also possible to handle resins which require molding at a high temperature, such as a resin for an optical application and a super engineering resin.

Preferably, the number of positioning ribs 1 formed is 1 to 2 if a size of positioning rib 1 is smaller than the molded product size (45 mm×350 mm) described above, and is 2 to 4 if the size of positioning rib 1 is about the molded product size (45 mm×350 mm) described above. However, the number of positioning ribs 1 is appropriately set depending on a size of a product area.

In FIGS. 1A to 3B, in general, a shape of a cut surface when positioning rib 1 is cut in a horizontal direction is a T shape, an I shape, a cross shape, an x shape, or the like, but may be a round shape, a triangular shape, a rectangular shape, a polygonal shape, or a star shape. That is, the shape of positioning rib 1 is not particularly limited as long as it has a function of fixing a position.

As illustrated in FIGS. 1A to 3B, positioning rib 1 is formed so as to project vertically downward from support layer 5.

For example, as material 31, wood, a decorative film on which a pattern is printed, stone, cork, cloth, natural leather, artificial leather, or the like can be used. However, material 31 is not necessary to be limited to these as long as material 31 can express a design according to the characteristics and needs of a product.

FIGS. 2A to 2D are cross-sectional views illustrating detailed cross-sectional structures of insert molding sheets according to first to fourth modification examples of the first exemplary embodiment. FIGS. 3A and 3B are cross-sectional views illustrating detailed cross-sectional structures of insert molding sheets according to fifth and sixth modification examples of the first exemplary embodiment.

As a typical example, a layer structure of insert molding sheet 41 when material 31 is wood will be described with reference to FIG. 1B. In this insert molding sheet, with respect to wood material sheet 32, thin film protective layer 3 and adhesive layer 4 are sequentially formed on a surface of wood material 2 derived from natural wood, support layer 5 is formed on the rear surface side of wood material 2, and positioning ribs 1 are attached to support layer 5.

Figure 2A:
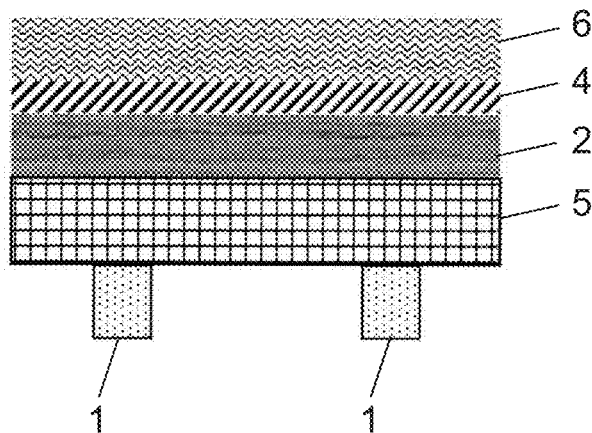
FIG. 2A is a cross-sectional view illustrating a detailed cross-sectional structure of an insert molding sheet according to a first modification example of the first exemplary embodiment.
Figure 2B:
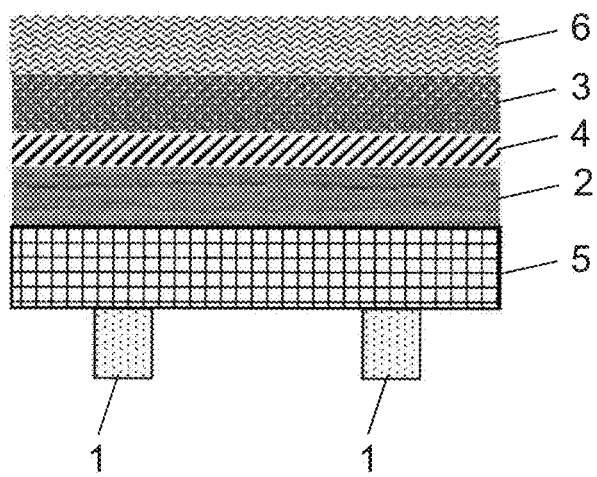
FIG. 2B is a cross-sectional view illustrating a detailed cross-sectional structure of an insert molding sheet according to a second modification example of the first exemplary embodiment.
Figure 2C:
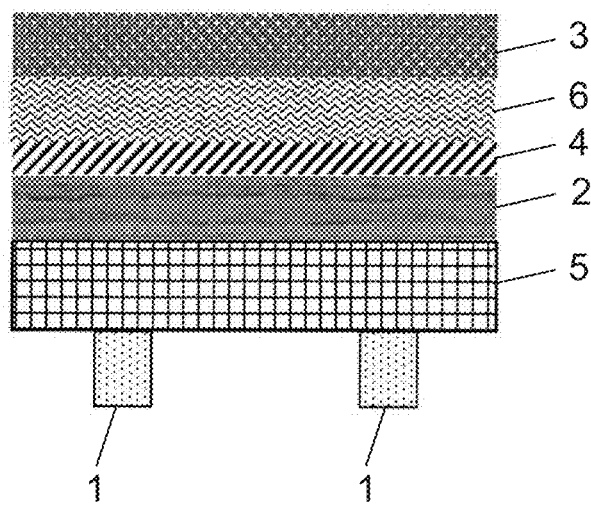
FIG. 2C is a cross-sectional view illustrating a detailed cross-sectional structure of an insert molding sheet according to a third modification example of the first exemplary embodiment.
Figure 2D:
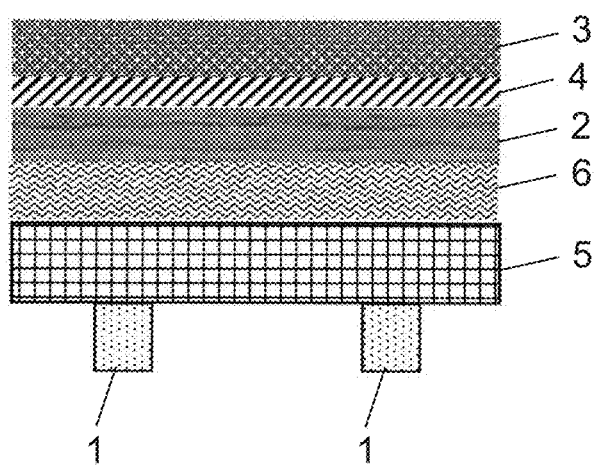
FIG. 2D is a cross-sectional view illustrating a detailed cross-sectional structure of an insert molding sheet according to a fourth modification example of the first exemplary embodiment.
Figure 3A:
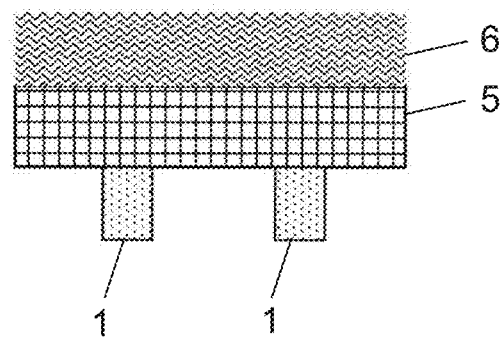
FIG. 3A is a cross-sectional view illustrating a detailed cross-sectional structure of an insert molding sheet according to a fifth modification example of the first exemplary embodiment.
Figure 3B:
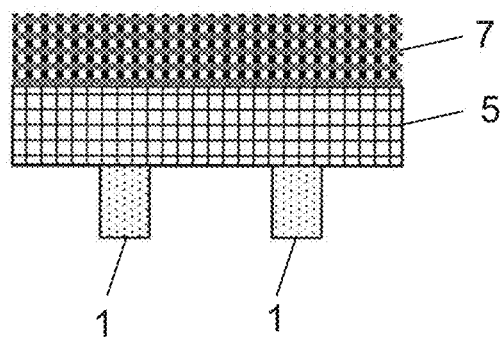
FIG. 3B is a cross-sectional view illustrating a detailed cross-sectional structure of an insert molding sheet according to a sixth modification example of the first exemplary embodiment.

As illustrated in FIG. 2A, insert molding sheet 41A according to the first modification example includes functional layer 6 having at least one of antireflection, high reflection, light scattering, water repellency, hydrophilicity, antibacterial, a high hardness function, and an image display function, instead of thin film protective layer 3. As illustrated in FIG. 2B, insert molding sheet 41B according to the second modification example has functional layer 6 on an upper layer of thin film protective layer 3. As illustrated in FIG. 2C, insert molding sheet 41C according to the third modification example has functional layer 6 between thin film protective layer 3 and wood material 2. As illustrated in FIG. 2D, insert molding sheet 41D according to the fourth modification example has functional layer 6 between wood material 2 and support layer 5.

As illustrated in FIG. 3A, insert molding sheet 41E according to the fifth modification example has a layer structure in which functional layer 6 is formed on the surface of support layer 5. As illustrated in FIG. 3B, insert molding sheet 41F according to the sixth modification example has a layer structure in which component layer 7 is formed on the surface of support layer 5. An example of component layer 7 includes a sensor, an electrical component, or an electronic component.

Method of Manufacturing Insert Molded Product

Next, a method of manufacturing the insert molded product using an insert molding sheet will be described. FIGS. 8A to 8D are schematic cross-sectional views illustrating each step of a method of manufacturing an insert molded product using the insert molding sheet according to the first exemplary embodiment.

Figure 8A:
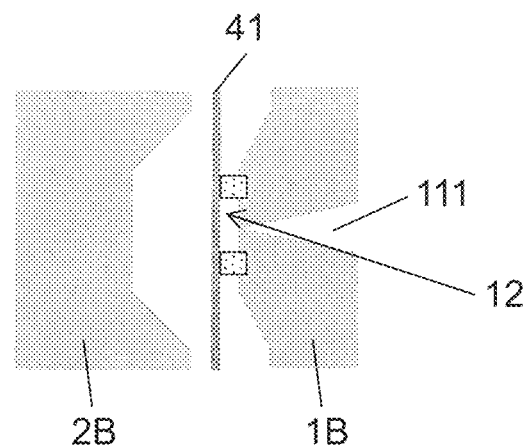
FIG. 8A is a schematic cross-sectional view illustrating one step of a method of manufacturing an insert molded product using the insert molding sheet according to the first exemplary embodiment.

(1) As illustrated in FIG. 8A, insert molding sheet 41 to which positioning rib 1 is attached is disposed and fixed to cavity 12 between stationary mold 1B and movable mold 2B. Specifically, positioning rib 1 on the rear surface of insert molding sheet 41 is set in a hole formed at a location corresponding to positioning rib 1 on a surface of stationary mold 1B for insert molding facing cavity 12, and insert molding sheet 41 is fixed.

Figure 8B:
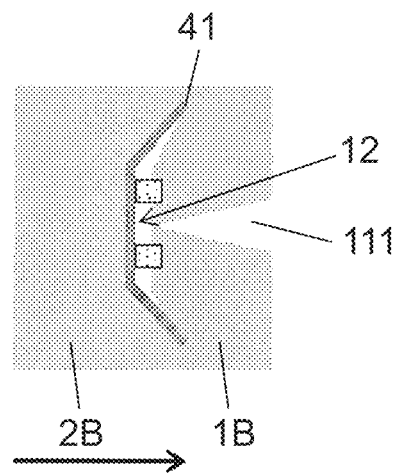
FIG. 8B is a schematic cross-sectional view illustrating one step of the method of manufacturing an insert molded product using the insert molding sheet according to the first exemplary embodiment.

(2) As illustrated in FIG. 8B, movable mold 2B is moved to perform mold clamping.

Figure 8C:
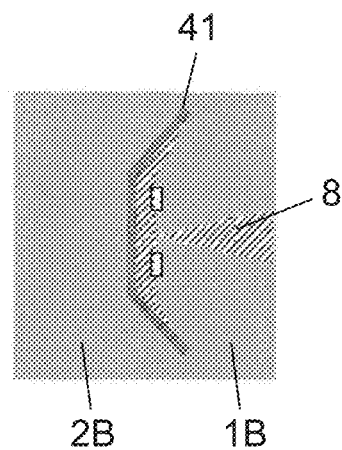
FIG. 8C is a schematic cross-sectional view illustrating one step of a method of manufacturing an insert molded product using the insert molding sheet according to the first exemplary embodiment.

(3) As illustrated in FIG. 8C, injection molding resin 8 is poured into cavity 12 in the mold from gate 111 opened in stationary mold 1B. For example, injection molding resin 8 includes a transparent resin material such as ABS, PMMA, or PC. However, the injection molding resin is not particularly limited to these as long as the same effect can be obtained, and there is no problem with other resin materials.

Figure 8D:
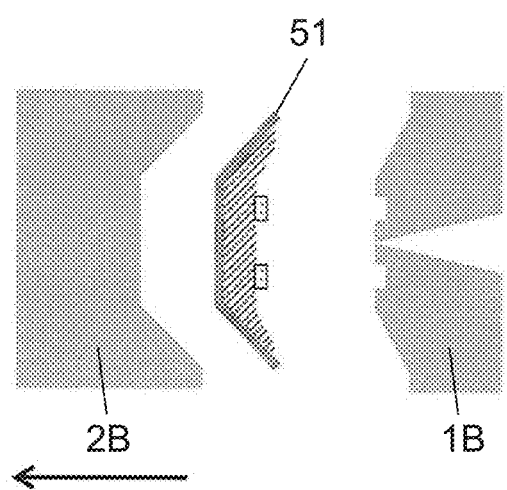
FIG. 8D is a schematic cross-sectional view illustrating one step of a method of manufacturing an insert molded product using the insert molding sheet according to the first exemplary embodiment.

(4) As illustrated in FIG. 8D, the mold is opened, and insert molded product 51 integrally molded with insert molding sheet 41 is picked up from the inside of the mold by a projection pin (not illustrated).

In this method of manufacturing an insert molded product, positioning rib 1 uses the same material as the resin used in the insert molding. Accordingly, after insert molding, positioning rib 1 is easily compatible with the injection molding resin used in the insert molding, and positioning rib 1 can be a portion of the molded product. Therefore, there is no gap at an interface between positioning rib 1 and the injection molding resin formed by insert molding, and a strong insert molded product can be obtained. By repeating this process, the insert molded product can be mass-produced.

Second Exemplary Embodiment

FIGS. 9A to 9G are schematic cross-sectional views illustrating each step of a method of manufacturing an insert molded product according to the second exemplary embodiment.

The method of manufacturing the insert molded product according to the second exemplary embodiment is different from the method of manufacturing the insert molded product according to the first exemplary embodiment in that preform of the insert molding sheet is performed in advance and the insert molding is performed using the preformed insert molding sheet.

Figure 9A:
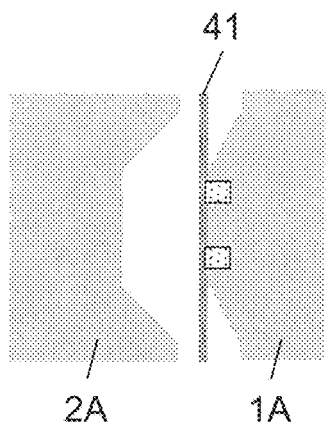
FIG. 9A is a schematic cross-sectional view illustrating one step of a method of manufacturing an insert molded product according to a second exemplary embodiment.

(1) As illustrated in FIG. 9A, in insert molding sheet 41 to which positioning rib 1 is attached, positioning rib 1 on the rear surface of insert molding sheet 41 is set in the hole formed at a location corresponding to positioning rib 1 in stationary mold 1A for preform.

Figure 9B:
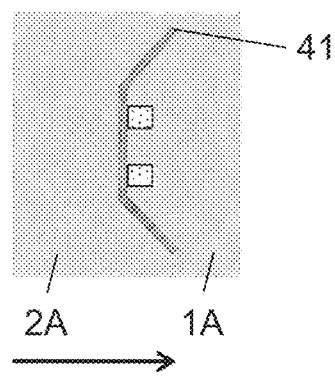
FIG. 9B is a schematic cross-sectional view illustrating one step of a method of manufacturing an insert molded product according to the second exemplary embodiment.

(2) As illustrated in FIG. 9B, movable mold 2A is moved to perform mold clamping and preform (formation) of insert molding sheet 41 is performed.

Figure 9C:
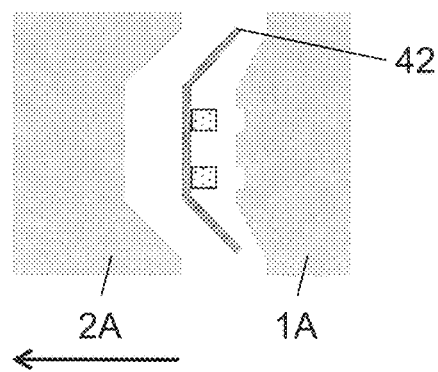
FIG. 9C is a schematic cross-sectional view illustrating one step of a method of manufacturing an insert molded product according to the second exemplary embodiment.

(3) As illustrated in FIG. 9C, the mold is opened, and the preformed (formed) insert molding sheet 42 is picked up from the inside of the mold.

Figure 9D:
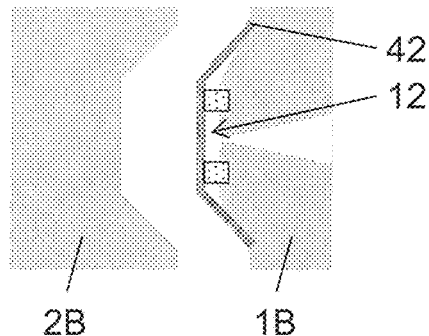
FIG. 9D is a schematic cross-sectional view illustrating one step of a method of manufacturing an insert molded product according to the second exemplary embodiment.

(4) Next, as illustrated in FIG. 9D, in preformed (formed) insert molding sheet 42, positioning rib 1 on the rear surface of insert molding sheet 42 is set in the hole formed in stationary mold 1B for insert molding at a location corresponding to positioning rib 1.

Figure 9E:
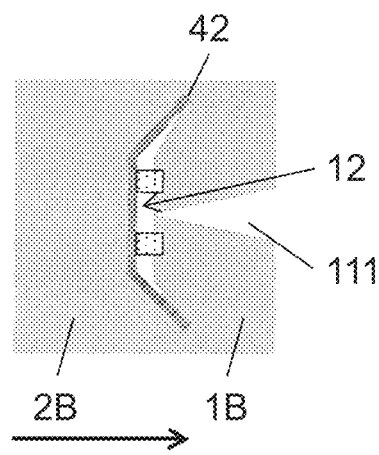
FIG. 9E is a schematic cross-sectional view illustrating one step of a method of manufacturing an insert molded product according to the second exemplary embodiment.

(5) As illustrated in FIG. 9E, movable mold 2B is moved to perform mold clamping.

Figure 9F:
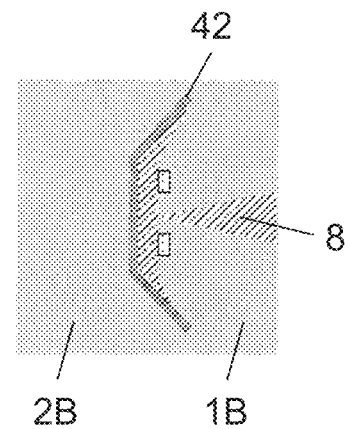
FIG. 9F is a schematic cross-sectional view illustrating one step of a method of manufacturing an insert molded product according to the second exemplary embodiment.

(6) As illustrated in FIG. 9F, injection molding resin 8 is poured into cavity 12 in the mold from gate 111 opened in stationary mold 1B.

Figure 9G:
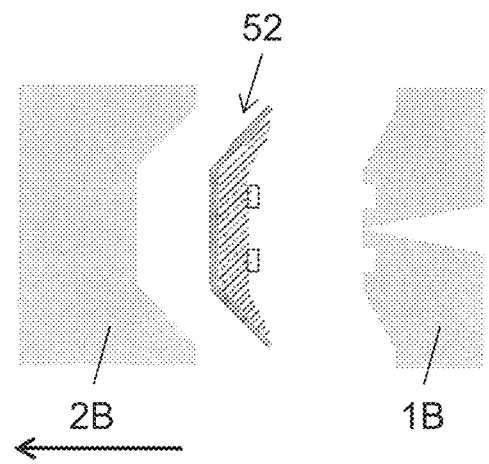
FIG. 9G is a schematic cross-sectional view illustrating one step of a method of manufacturing an insert molded product according to the second exemplary embodiment.

(7) As illustrated in FIG. 9G, the mold is opened, and insert molded product 52 is picked up.

Third Exemplary Embodiment

FIGS. 10A to 10E are schematic cross-sectional views illustrating each step of the method of manufacturing an insert molded product according to the third exemplary embodiment.

The method of manufacturing the insert molded product according to the third exemplary embodiment is different from the method of manufacturing the insert molded product according to the first exemplary embodiment in that the preform of the insert molding sheet is performed and the insert molding is performed in the mold for insert molding. The method of manufacturing the insert molded product according to the third exemplary embodiment is different from the method of manufacturing the insert molded product according to the second exemplary embodiment in that the preform of the insert molding sheet is performed in the mold for insert molding without using a preform mold.

Figure 10A:
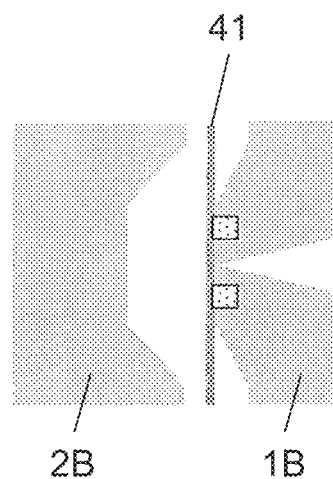
FIG. 10A is a schematic cross-sectional view illustrating one step of a method of manufacturing an insert molded product according to a third exemplary embodiment.

(1) As illustrated in FIG. 10A, in insert molding sheet 41 to which positioning rib 1 is attached, positioning rib 1 on the rear surface of insert molding sheet 41 is set in a hole formed at a location corresponding to positioning rib 1 in stationary mold 1B for insert molding.

Figure 10B:
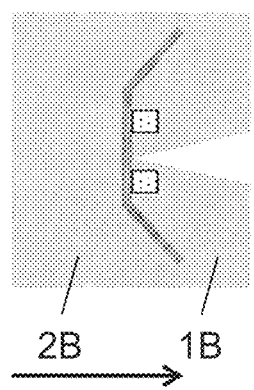
FIG. 10B is a schematic cross-sectional view illustrating one step of a method of manufacturing an insert molded product according to the third exemplary embodiment.

(2) As illustrated in FIG. 10B, movable mold 2B is moved to perform mold clamping and preform (formation) of insert molding sheet 41 is performed.

Figure 10C:
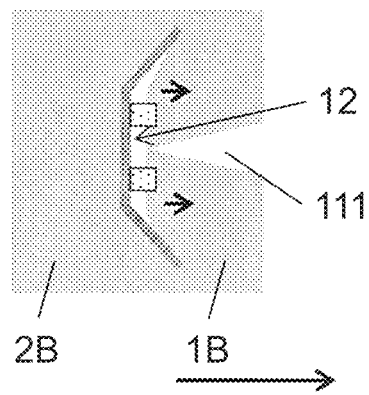
FIG. 10C is a schematic cross-sectional view illustrating one step of a method of manufacturing an insert molded product according to the third exemplary embodiment.

(3) As illustrated in FIG. 10C, stationary mold 1B is provided as a core structure, and a core is pulled in a direction of an arrow to provide cavity 12 between stationary mold 1B and movable mold 2B.

Figure 10D:
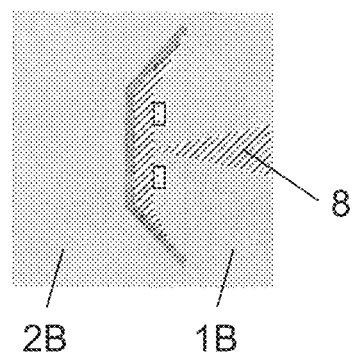
FIG. 10D is a schematic cross-sectional view illustrating one step of a method of manufacturing an insert molded product according to the third exemplary embodiment.

(4) As illustrated in FIG. 10D, injection molding resin 8 is poured into cavity 12 in the mold from gate 111 opened in stationary mold 1B.

Figure 10E:
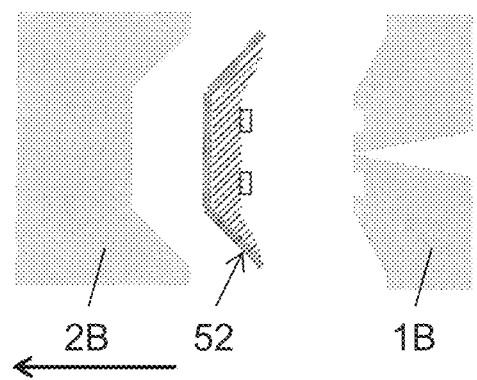
FIG. 10E is a schematic cross-sectional view illustrating one step of a method of manufacturing an insert molded product according to a third exemplary embodiment.

(5) As illustrated in FIG. 10E, the mold is opened, and insert molded product 52 is picked up.

This method of manufacturing an insert molded product is characterized in that the core on stationary mold 1B side on which the surface of insert molding sheet 41 on which positioning rib 1 is formed is disposed is movable. Therefore, during preform processing, insert molding sheet 42 can be press-processed at the time of the mold clamping to perform the preform processing. The preform processing of the molding sheet, specifically, the molding sheet is press-processed with a preheated mold to deform the molding sheet into a mold shape. After that, the molding sheet can be sandwiched by the mold as it is, the mold and the molding sheet are cooled to a specific temperature, and the shape when the molding sheet is press-processed can be transferred (FIG. 10B).

After the preform, the core (core type) of the stationary mold at the portion into which the injection molding resin is inserted can be moved to provide cavity 12 which is a region which can be filled with the injection molding resin (FIG. 10C). After that, if necessary, the mold is heated to a specific temperature and then injection molding resin 8 is poured into stationary mold 1B side from gate 111 formed in advance, and thus, the insert molding processing may be performed. In this way, it is not necessary to make molds for the preform processing and the insert molding processing, respectively, a mold cost can be reduced, the process from the preform processing to insert molding can be completed with one set of molds, and thus, productivity increases.

Fourth Exemplary Embodiment

Insert Molding Sheet

Figure 11A:
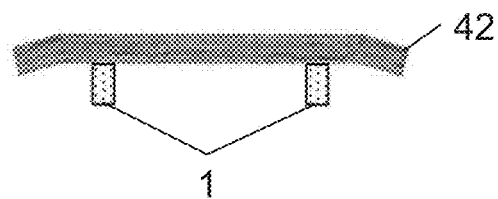
FIG. 11A is a cross-sectional view when a positioning rib type insert molding sheet for a front surface of two insert molding sheets according to a fourth exemplary embodiment is viewed from a direction perpendicular to a thickness direction of the insert molding sheet.
Figure 11B:
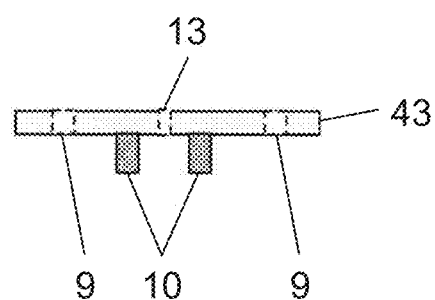
FIG. 11B is a cross-sectional view when a positioning rib type insert molding sheet for a rear surface of the two insert molding sheets according to the fourth exemplary embodiment is viewed from a direction perpendicular to a thickness direction of the insert molding sheet.
Figure 11C:
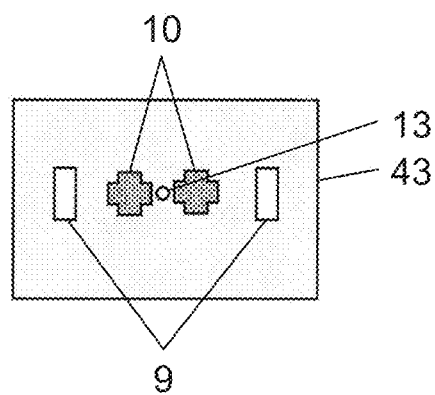
FIG. 11C is a bottom view when the insert molding sheet for the rear surface of FIG. 11B is viewed from the rear surface side.

FIG. 11A is a cross-sectional view when positioning rib type insert molding sheet 42 for a front surface of two insert molding sheets according to a fourth exemplary embodiment is viewed from a direction perpendicular to a thickness direction of insert molding sheet 42. FIG. 11B is a cross-sectional view when positioning rib type insert molding sheet 43 for a rear surface of the two insert molding sheets according to the fourth exemplary embodiment is viewed from a direction perpendicular to a thickness direction of insert molding sheet 43. FIG. 11C is a bottom view when insert molding sheet 43 for the rear surface of FIG. 11B is viewed from the rear surface side.

Two insert molding sheets 42 and 43 are for the front surface and the rear surface, respectively, insert molding sheet 42 coats the front surface of the insert molded product, and insert molding sheet 43 is disposed on the rear surface of the insert molded product.

As illustrated in FIG. 11A, in insert molding sheet 42 for the front surface to be disposed on the front surface of the insert molded product, positioning rib 1 to be fixed to stationary mold 1B for insert molding is provided on the rear surface side. As illustrated in FIG. 11B, in insert molding sheet 43 for the rear surface to be disposed on the rear surface of the insert molded product, positioning rib 10 to be fixed to stationary mold 1B for insert molding is provided on the rear surface side. As illustrated in FIG. 11B, insert molding sheet 43 for the rear surface has hole 9 through which positioning rib 1 attached to insert molding sheet 42 for the front surface passes, positioning rib 10, and hole 13 through which injection molding resin 8 passes.

In FIG. 11A, insert molding sheet 42 for the front surface is illustrated using insert molding sheet 42 which has been preformed (formed) in advance. However, there is no problem even if insert molding sheet 41 where the preform (formation) has not been performed is used, and also in FIGS. 12A to 12E, 13A to 13C, and 14A to 14E below, an example of using insert molding sheet 42 where the preform has been performed similarly will be described.

Method of Manufacturing Insert Molded Product

FIGS. 12A to 12E are schematic cross-sectional views illustrating each step of a method of manufacturing an insert molded product according to the fourth exemplary embodiment.

Figure 12A:
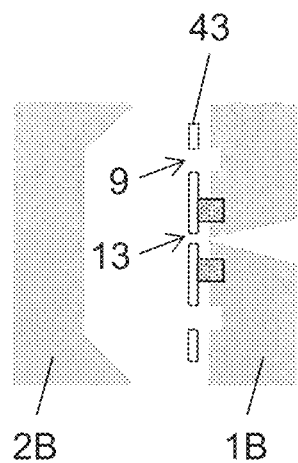
FIG. 12A is a schematic cross-sectional view illustrating one step of a method of manufacturing an insert molded product according to a fourth exemplary embodiment.

(1) As illustrated in FIG. 12A, in insert molding sheet 43 for the rear surface to which positioning rib 10 is attached, positioning rib 10 on the rear surface of insert molding sheet 43 is set in a hole formed at a location corresponding to positioning rib 10 in stationary mold 1B for insert molding.

Figure 12B:
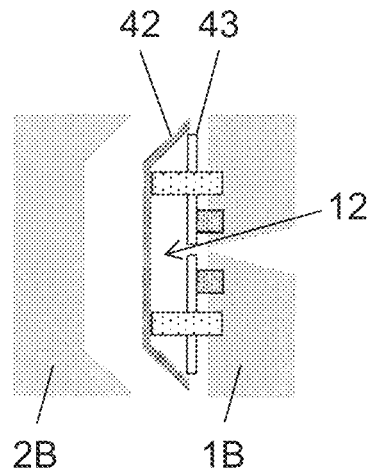
FIG. 12B is a schematic cross-sectional view illustrating one step of a method of manufacturing an insert molded product according to the fourth exemplary embodiment.

(2) As illustrated in FIG. 12B, positioning rib 1 on the rear surface of insert molding sheet 42 for the front surface passes through hole 9 provided at the corresponding location of insert molding sheet 43 for the rear surface. Positioning rib 1 is set in a hole formed at a location corresponding to positioning rib 1 of stationary mold 1B for insert molding.

Figure 12C:
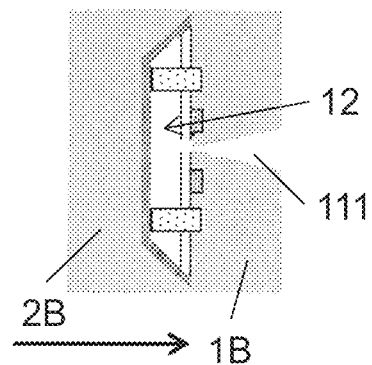
FIG. 12C is a schematic cross-sectional view illustrating one step of a method of manufacturing an insert molded product according to the fourth exemplary embodiment.

(3) As illustrated in FIG. 12C, movable mold 2B is moved to perform mold clamping.

Figure 12D:
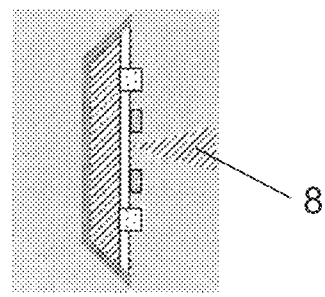
FIG. 12D is a schematic cross-sectional view illustrating one step of a method of manufacturing an insert molded product according to the fourth exemplary embodiment.

(4) As illustrated in FIG. 12D, injection molding resin 8 is poured into cavity 12 in the mold from gate 111 opened in stationary mold 1B through hole 13 of insert molding sheet 43 for the rear surface. Hole 13 is illustrated as a circular hole as illustrated in FIG. 11C, but hole 13 is not limited to this.

Figure 12E:
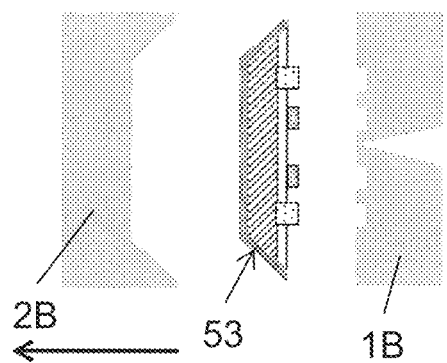
FIG. 12E is a schematic cross-sectional view illustrating one step of a method of manufacturing an insert molded product according to the fourth exemplary embodiment.

(5) As illustrated in FIG. 12E, the mold is opened, and insert molded product 53 is picked up.

Insert Molded Product

Figure 15A:
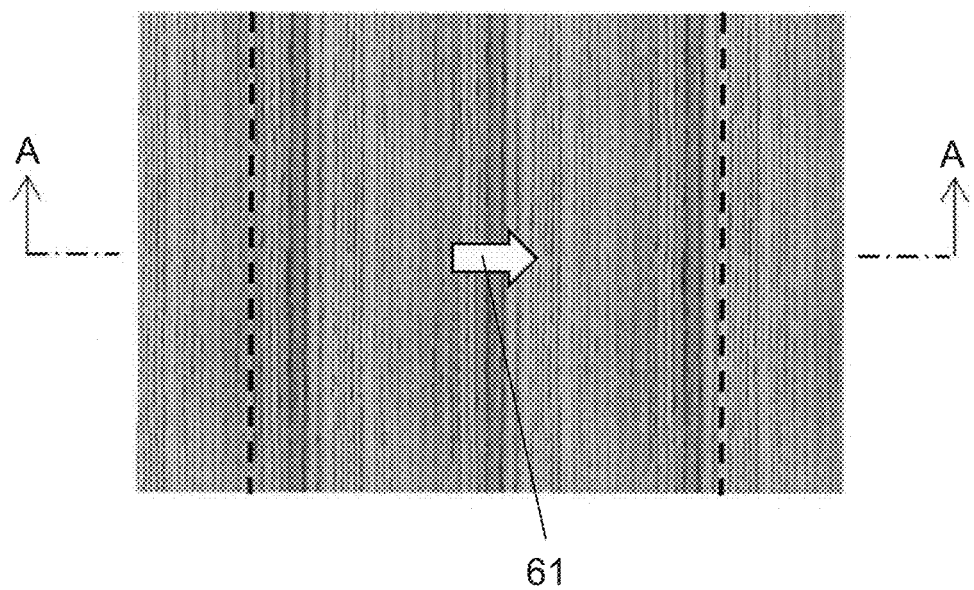
FIG. 15A is a plan view when the insert molded product according to the fourth exemplary embodiment is viewed from a front surface side.
Figure 15B:
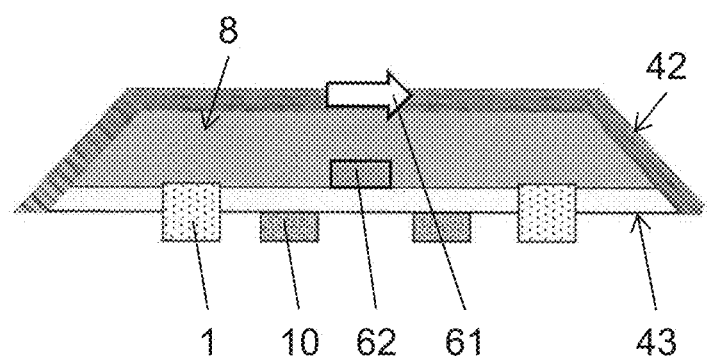
FIG. 15B is a cross-sectional view illustrating a cross-sectional structure viewed in a direction A-A of FIG. 15A.
Figure 16:
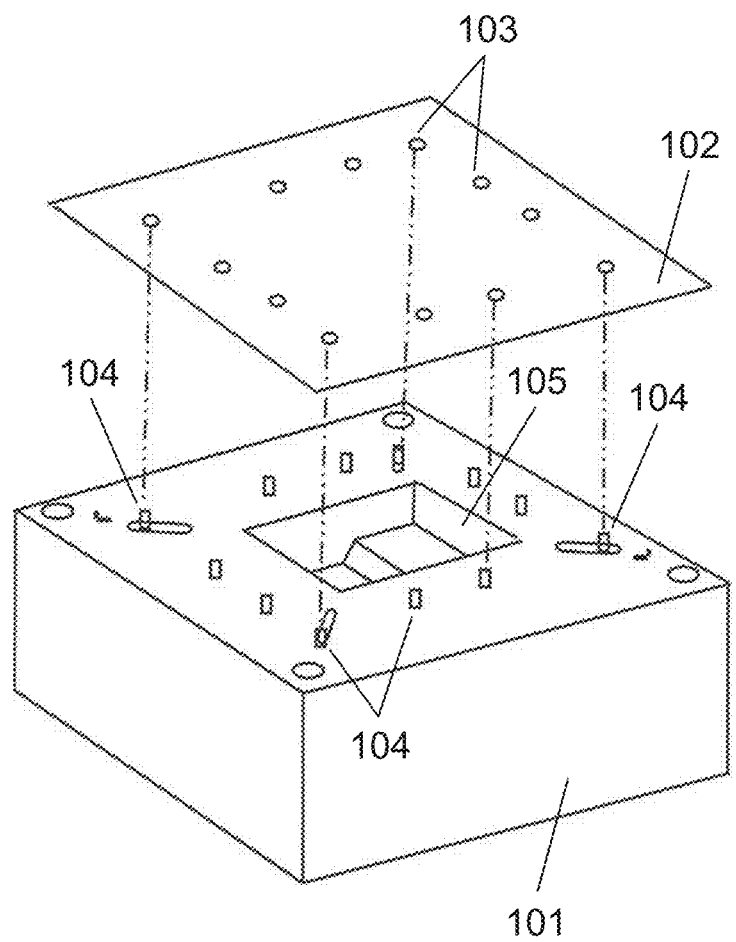
FIG. 16 is a schematic perspective view illustrating one step of a method of manufacturing an insert molded product using a decorative sheet material described in Japanese Patent Unexamined Publication No 9-123208.

FIG. 15A is a plan view when insert molded product 53 according to the fourth exemplary embodiment is viewed from the front surface side. FIG. 15B is a cross-sectional view illustrating a cross-sectional structure viewed in a direction A-A of FIG. 15A.

As illustrated in FIG. 15A, insert molded product 53 is configured by filling injection molding resin 8 between insert molding sheet 42 for the front surface and insert molding sheet 43 for the rear surface. According to insert molded product 53, a decorative film on the insert molding sheet for the front surface and a circuit film on the insert molding sheet for the rear surface can be aligned with high accuracy. For example, by aligning a position of symbol mark 61 of the decorative film on the front surface side with a position of LED 62 of the circuit film on the rear surface side with high accuracy, light can be emitted more uniformly from a center of symbol mark 61 of the decorative film on the front surface.

In this way, even in applications which require high accuracy alignment between the decorative film on the front surface, and the sensor film or the circuit film on the rear surface, or a film on the rear surface in which the sensor and the circuit are integrated with each other, it is possible to provide a sensor and a molded component with a circuit function having a high-quality design.

Fifth Exemplary Embodiment

Insert Molding Sheet

Figure 13A:
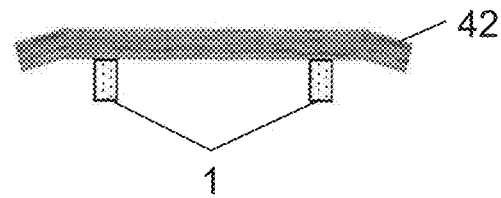
FIG. 13A is a cross-sectional view when a positioning rib type insert molding sheet for a front surface of two insert molding sheets according to a fifth exemplary embodiment is viewed from a direction perpendicular to a thickness direction of the insert molding sheet.
Figure 13B:
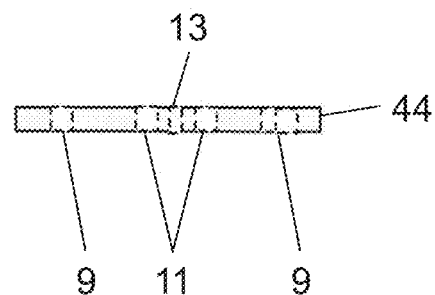
FIG. 13B is a cross-sectional view when a positioning pin type insert molding sheet for a rear surface of the two insert molding sheets according to the fifth exemplary embodiment is viewed from a direction perpendicular to a thickness direction of the insert molding sheet.
Figure 13C:
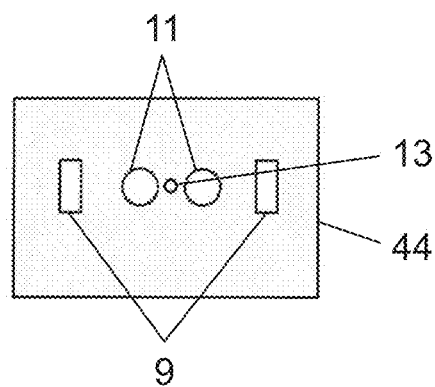
FIG. 13C is a bottom view when the insert molding sheet for the rear surface of FIG. 13B is viewed from the rear surface side.

FIG. 13A is a cross-sectional view when positioning rib type insert molding sheet 42 for a front surface of two insert molding sheets according to a fifth exemplary embodiment is viewed from a direction perpendicular to a thickness direction of insert molding sheet 42. FIG. 13B is a cross-sectional view when positioning pin type insert molding sheet 44 for a rear surface of two insert molding sheets according to the fifth exemplary embodiment is viewed from a direction perpendicular to a thickness direction of insert molding sheet 44. FIG. 13C is a bottom view when insert molding sheet 44 for the rear surface of FIG. 13B is viewed from the rear surface side.

Two insert molding sheets 42 and 44 are for the front surface and the rear surface, respectively, insert molding sheet 42 coats the front surface of the insert molded product, and insert molding sheet 44 is disposed on the rear surface of the insert molded product.

Two insert molding sheets 42 and 44 according to the fifth exemplary embodiment are different from the two insert molding sheets according to the fourth exemplary embodiment in that insert molding sheet 44 for the rear surface is not a positioning rib type sheet but a positioning pin type sheet. As long as the same effect can be obtained, insert molding sheet 44 is not necessary to be limited to this.

Insert molding sheet 44 for the rear surface has hole 9 through which positioning rib 1 of the insert molding sheet for the front surface passes, hole 11 through which positioning pin 3A provided in the mold passes, and hole 13 through which injection molding resin 8 passes.

Method of Manufacturing Insert Molded Product

FIGS. 14A to 14E are schematic cross-sectional views illustrating each step of a method of manufacturing an insert molded product according to the fifth exemplary embodiment.

Figure 14A:
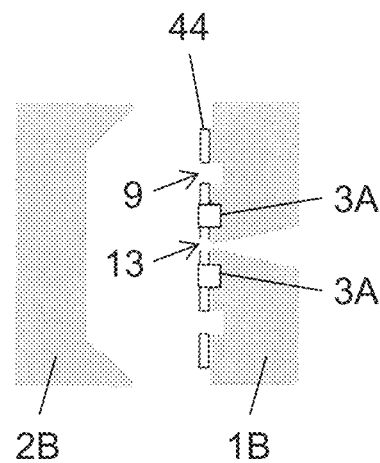
FIG. 14A is a schematic cross-sectional view illustrating one step of a method of manufacturing an insert molded product according to the fifth exemplary embodiment.

(1) As illustrated in FIG. 14A, positioning pin 3A is provided in stationary mold 1B for insert molding. Meanwhile, hole 11 through which positioning pin 3A passes is formed in insert molding sheet 44 for the rear surface disposed on the rear surface of the molded product. Positioning pin 3A passes through hole 11 of insert molding sheet 44 for the rear surface, and thus, insert molding sheet 44 is set in stationary mold 1B.

Figure 14B:
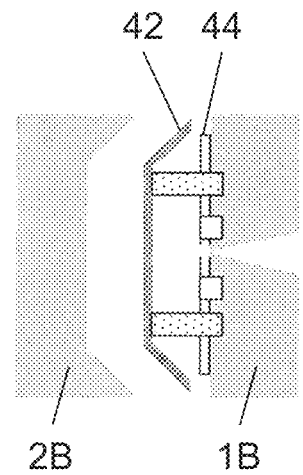
FIG. 14B is a schematic cross-sectional view illustrating one step of a method of manufacturing an insert molded product according to the fifth exemplary embodiment.

(2) As illustrated in FIG. 14B, positioning rib 1 on the rear surface of insert molding sheet 42 for the front surface passes through hole 9 provided at a corresponding location of insert molding sheet 44 for the rear surface.

Positioning rib 1 is set in a hole formed at a location corresponding to positioning rib 1 of stationary mold 1B for insert molding.

Figure 14C:
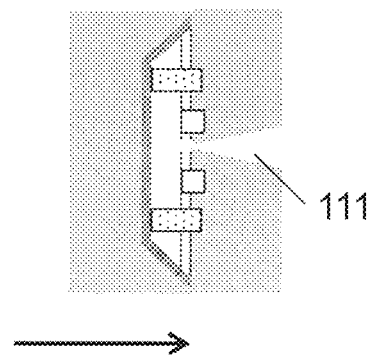
FIG. 14C is a schematic cross-sectional view illustrating one step of a method of manufacturing an insert molded product according to the fifth exemplary embodiment.

(3) As illustrated in FIG. 14C, movable mold 2B is moved to perform mold clamping.

Figure 14D:
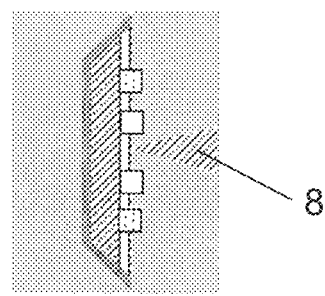
FIG. 14D is a schematic cross-sectional view illustrating one step of a method of manufacturing an insert molded product according to the fifth exemplary embodiment.

(4) As illustrated in FIG. 14D, injection molding resin 8 is poured into cavity 12 in the mold from gate 111 opened in stationary mold 1B through hole 13 of insert molding sheet 44 for the rear surface. Hole 13 is illustrated as a circular hole as illustrated in FIG. 11C, but hole 13 is not limited to this.

Figure 14E:
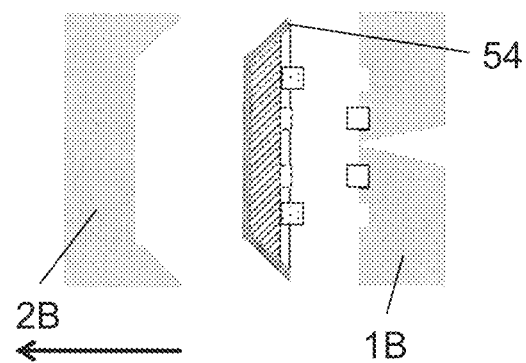
FIG. 14E is a schematic cross-sectional view illustrating one step of a method of manufacturing an insert molded product according to the fifth exemplary embodiment.

(5) As illustrated in FIG. 14E, the mold is opened, and insert molded product 54 is picked up.

The method of manufacturing the insert molded product is used. Accordingly, the positions of the decorative film on the front surface side and the decorative film on the rear surface side, the sensor film or the circuit film on the rear surface side, or the like can be aligned by the positioning rib with higher accuracy than the method of the related art. As an application, different patterns are respectively provided in advance on a decorative film on a front surface side and a decorative film on a rear surface side, the decorative film on the front surface side and the decorative film on the rear surface side are interposed between transparent molding resins, the patterns of the decorative film on the front surface side and the decorative film on the rear surface side are combined with each other, and thus, the application can be used for creating a design with a sense of depth. Alternatively, normally, in an aspect in which only design of a decorative film surface formed on a front surface can be visually recognized, and if necessary, design of a decorative film on a rear surface side can be highlighted by illuminating illumination from the decorative film side on the rear surface side, it is possible to provide a decorative molded component with a high-quality design in an application where figures and patterns of the decorative film on the front surface side and the decorative film on the rear surface side are required to be aligned with high accuracy.

As another application, even in an application where the front surface side is the decorative film and the rear surface side is the sensor, the circuit film, or the sensor and circuit film being integrated with each other, switch mark and symbol for an electrostatic sensor formed on the decorative film on the front surface and a sensor of the sensor film on the rear surface can be aligned with high accuracy.

The present disclosure includes appropriately combining any of the various exemplary embodiments and/or examples described above, and the combination can achieve effects of each exemplary embodiment and/or example.

The insert molding sheet according to the present disclosure contributes to high design in fields which require decoration such as exteriors of various home electric appliances or in-vehicle interiors.

What is claimed is:

1. An insert molding sheet to be used for insert molding, the insert molding sheet comprising:
   a support layer including a first surface and a second surface that are on opposite sides of the support layer;
   a material sheet containing at least one material selected from the group consisting of a printed film, wood, stone, cork, cloth, leather, and metal;
   a thin film protective layer;
   an adhesive layer adhering the thin film protective layer and the material sheet to each other; and
   a first hole through which a first positioning rib of another insert molding sheet to be fixed to a surface of a mold facing a cavity passes,
   wherein the material sheet is formed directly on the first surface of the support layer and is disposed between the support layer and the adhesive layer, and
   wherein the support layer is a single layer.

2. The insert molding sheet of claim 1, further comprising:
   a functional layer,
   wherein the functional layer has at least one function selected from the group consisting of antireflection, high reflection, light scattering, water repellency, hydrophilicity, sterilization, antibacterial, a high hardness function, and an image display function.

3. The insert molding sheet of claim 1,
   wherein at least one selected from the group consisting of a sensor, an electric circuit, and an electronic component is disposed on one surface of the insert molding sheet.

4. The insert molding sheet of claim 1, further comprising:
   a second positioning rib to be fixed to the surface of the mold.

5. The insert molding sheet of claim 1, further comprising:
   a second hole through which a second positioning rib to be fixed to the surface of the mold passes.

* * * * *